G. F. ROOKE.
FARE REGISTER.
APPLICATION FILED JULY 1, 1909. RENEWED JULY 5, 1918.

1,294,308.

Patented Feb. 11, 1919.
3 SHEETS—SHEET 1.

Witnesses,
Catherine G. Bradley
James H. Thurston

Inventor;
George F. Rooke,
By Wilmarth H. Thurston,
Attorneys.

G. F. ROOKE.
FARE REGISTER.
APPLICATION FILED JULY 1, 1909. RENEWED JULY 5, 1918.

1,294,308.

Patented Feb. 11, 1919.
3 SHEETS—SHEET 2.

Witnesses,
Catherine G. Bradley.
James H. Thurston.

Inventor;
George F. Rooke,
By Wilmarth H. Thurston,
Attorneys.

G. F. ROOKE.
FARE REGISTER.
APPLICATION FILED JULY 1, 1909. RENEWED JULY 5, 1918.

1,294,308.

Patented Feb. 11, 1919.
3 SHEETS—SHEET 3.

WITNESSES:
C. G. Bradley
J. H. Thurston

INVENTOR
George F. Rooke,
BY
Wilmarth H. Thurston
ATTORNEY

UNITED STATES PATENT OFFICE.

GEORGE F. ROOKE, OF PROVIDENCE, RHODE ISLAND, ASSIGNOR TO ROOKE AUTOMATIC REGISTER COMPANY, OF AUGUSTA, MAINE, A CORPORATION OF MAINE.

FARE-REGISTER.

1,294,308.   Specification of Letters Patent.   Patented Feb. 11, 1919.

Application filed July 1, 1909, Serial No. 505,370. Renewed July 5, 1918. Serial No. 243,468.

*To all whom it may concern:*

Be it known that I, GEORGE F. ROOKE, of the city and county of Providence and State of Rhode Island, have invented certain new and useful Improvements in Fare-Registers; and I do hereby declare the following specification, taken in connection with the accompanying drawings, forming a part of the same, to be a full, clear, and exact description thereof.

The present invention relates to fare-registers, and more particularly to fare-registers of the portable type such as forms the subject of Letters Patent No. 690,079, granted to me December 31, 1901.

The fare-register of said prior patent was adapted to register coins of one denomination only, as for example, nickels. One object of the present invention is to provide means whereby the register will be adapted to register coins of two different denominations, as for example, nickels and dimes.

To that end the first feature of invention consists of a fare register comprising two registering counters for registering coins of different denominations, and means for causing one of said counters to be operated when a coin of one denomination is inserted and for causing the other counter to be operated when a coin of the other denomination is inserted.

In the embodiment of the invention shown in the drawings, the construction is such that one of said counters will be operated by the coins of both denominations, which counter may be termed the primary counter, while the other counter, which may be termed the secondary counter, will be operated by only one of the coins and preferably the coin of higher denomination. Thus when the two coins are nickels and dimes respectively, one of the counters will be operated by both the nickels and the dimes, whereas the other counter will be operated only by the dimes. With this construction, as will be seen, the figures on the primary counter will correspond to the total number of coins passed through the machine, while the figures on the secondary counter will correspond to the total number of dimes passed through the machine, while the sum of the figures on the two counters will correspond to the total number of five cent fares received and registered.

A further feature of invention, therefore, consists in providing means whereby the primary counter may be operated directly from the sliding coin-carriage, and so that said counter will be operated at each to-and-fro movement of said carriage. In the construction shown the primary counter is actuated by a direct connection between the shaft of said counter and said sliding carriage.

A further feature of invention consists in providing means for determining whether the secondary counter shall or shall not be operated. In the construction shown the means for determining whether said secondary counter shall or shall not be operated, and which for convenience may be termed selective means, is controlled by the coins themselves, one of said coins, as for example the nickel, serving to control said selective means in a way to prevent the operation of the secondary counter, while the other coin, as for example, the dime, serves to control said selective means in such a way as to cause said secondary counter to be operated.

The invention further consists in an improved construction of gripping devices for gripping the coin when inserted in the register, and so that the coin cannot be thereafter withdrawn, and for holding the coin for a greater or less portion of the travel of the sliding carriage as the coin is carried along by said carriage.

The invention further consists of features of construction and certain combinations of parts hereinafter described and claimed.

Referring to the drawings, Figure 1 is a rear elevation of the mechanism of a fare register embodying my invention, the casing therefor being omitted.

Fig. 9 is a side view of the gripping mechanism.

Figure 1:
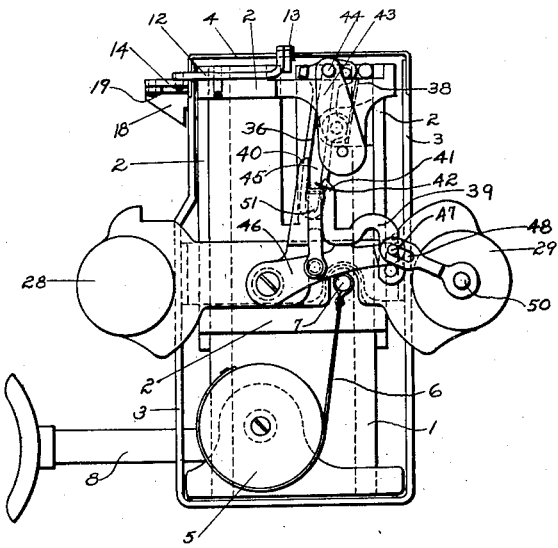
Figure 2:
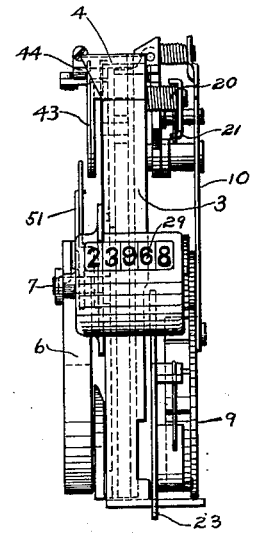
Fig. 2 is a side elevation looking toward the left in Fig. 1.

The general construction of the mechanism shown in the drawings is similar to that shown in my Patent No. 690,079, December 31, 1901, to which reference may be had.

1 represents the frame upon which the several parts are mounted, said frame having a longitudinal passage extending therethrough, and so that said frame also constitutes the coin-chute, said frame further constituting the guide for the sliding carriage 2. Pivoted to the frame or coin-chute on opposite sides thereof is a swinging rectangular frame 3, the upper end 4 of which constitutes a shutter for the upper end of the coin-chute, as described in my prior patent referred to. Mounted on the frame is a spring-motor 5. To the drum of said motor one end of a connecting strap 6 is secured, the other end of said strap being connected to a pin 7 on the sliding carriage. As more fully explained in my prior patent referred to, the carriage is moved upward by pushing inward the rack-bar 8, the inward movement of said rack-bar serving to rotate the crank-wheel 9, said crank-wheel being connected to the sliding carriage by means of the pitman 10.

By this construction, as will be understood, when the rack-bar 8 is pushed inward, the crank-wheel 9 will be rotated in a direction to move the sliding carriage upward, and this upward movement of the sliding carriage will, through the strap connection 6, serve to wind up the spring of the spring-motor 5, and so that when permitted to do so, said spring-motor will serve to pull the carriage downward.

The sliding carriage 2 is latched in its upper position against the pull of the spring-motor by a latch such as described in said prior patent, it being understood that said latch is adapted to be disengaged by the insertion of a coin and so as to thereby release the sliding carriage and permit the same to be pulled downward by the spring-motor. The release of the carriage by the insertion of a coin is effected by the action of a pivoted tripper 11. This pivoted tripper is in the form of a bell-crank lever, one arm 11$^a$ of which extends across the upper end of the coin-chute in the path of the coin, and the other arm 11$^b$ of which tripper serves to unlatch the latch which holds the carriage in its raised position.

Figure 11:
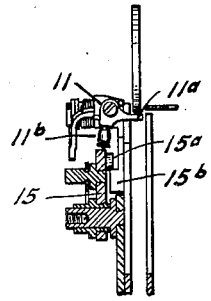
Fig. 11 is a section on the line $x-x$ of Fig. 10.

The latching of the carriage in its upper position is effected by the engagement of a roll 15$^a$ carried by the oscillating plate 15 to be hereafter referred to, with a lug or projection 15$^b$ secured to the frame 2, as shown in Fig. 11, said roll 15$^a$ constituting the latch above mentioned.

The present mechanism is provided with a new and improved form of gripping device, said gripping device being provided with two movable gripping jaws adapted to grip the coin upon its opposite sides. Pivoted to suitable brackets on opposite sides of the sliding carriage are two levers 12, 12, on the inner ends of which are mounted the gripping jaws 13, 13, said levers being pivoted at 12$^a$, 12$^a$, respectively, and the outer ends of said levers are connected by a pair of toggle links 14, 14.

Pivoted on the carriage 2 is an oscillating plate or lever 15 having two projections or arms 16 and 17. The arm 16, when the carriage is raised, abuts against the arm 11$^b$ of the tripper 11, while the arm 17 is connected to a link 18, said link 18 being bent around the side of the carriage and connected to the pivot 19 of the toggle links.

Suitably mounted on the frame at one side of the oscillating plate 15 is a torsion-spring 20 adapted to actuate the pivoted arm 21. A link 22 connects said pivoted arm with the oscillating plate 15, the construction being such that when the carriage is in its elevated position the spring 20 tends to pull the oscillating plate to the left in Fig. 7, and so as to hold the arm 16 against the arm 11$^b$ of the trigger 11, and so that when said trigger is tripped by the insertion of a coin and the arm 11$^b$ thereby moved out of the path of the arm 16, said oscillating plate will be moved to the left by the action of said spring. This movement of said oscillating plate will serve through the connecting link 18 to straighten the toggle-links and thereby move the gripping jaws inward into engagement with the coin.

Figure 7:
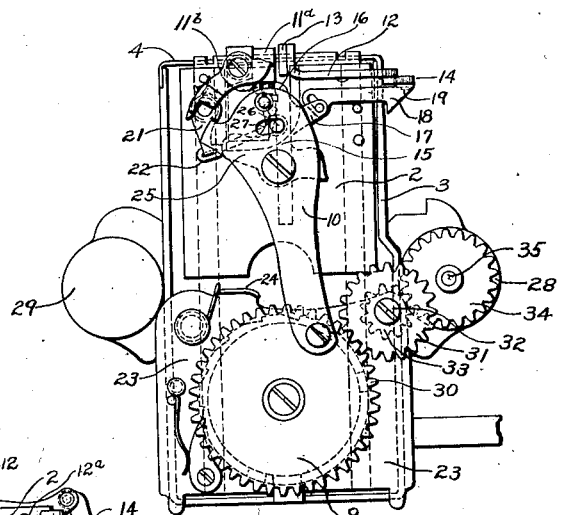
Fig. 7 is a front elevation of said mechanism.
Figure 8:
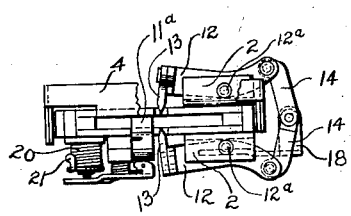
Fig. 8 is a plan view with certain parts removed to show the gripping devices.
Figure 10:
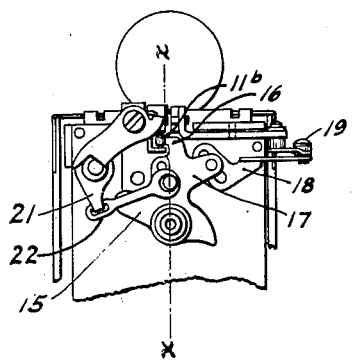
Fig. 10 is a front view of the upper portion of the mechanism with certain parts removed.

When the tripper 11 is thus tripped by the coin, and so as to move the arm 11$^b$ out of the path of the arm 16 of the oscillating plate, and so that said oscillating plate is then free to be moved to the left in Fig. 7 by the action of the spring 20, such movement of said oscillating plate serves to unlatch the sliding carriage which now begins to descend under the action of the spring motor 5. Secured to the frame is a plate 23. Said plate is provided with a cam projection 24. The oscillating plate 15 has still another arm 25 which is so arranged that as the carriage descends said arm 25 will come in contact with the cam projection 24. As the carriage continues to descend the cam projection 24 through its engagement with the arm 25 serves to rock said oscillating plate 15 to the right in Fig. 7, and this movement of said oscillating plate serves through the connecting link 18 to open the toggle 14 and thus open the gripping jaws and release the coin from the grip thereof.

It will be noted that as the oscillating plate is moved by the cam projection 24 to open the gripping jaws, such movement of the oscillating plate will, through the connecting link 22, rock the arm 21 so as to set up tension in the torsion-spring 20. As will be seen, it is necessary to hold the gripping jaws open and thus to hold the oscillating plate 15 against the action of the torsion-spring 20 when tension has been set up in said spring in the manner described, and for this purpose a connection is made between said oscillating plate and the pitman 10, said connection consisting of a pin 26 which projects from said oscillating plate through an elongated slot 27 formed in said pitman.

The arrangement is such that when the cam projection 24 has ceased to act upon the arm 25 of the oscillating plate, the pitman will have arrived at a position to bring the end of the slot 27 against the pin 26, and so that during the upward movement of the carriage the gripping jaws will be held open against the action of the spring 20 by the engagement of the end of the slot 27 with said pin 26 until the arm 16 of the oscillating plate comes into engagement with the arm 11$^b$ of the trigger 11, and thereafter the gripping jaws will be held open by the engagement of said arm 16 with said arm 11$^b$.

The present mechanism is provided as shown with two counters 28 and 29 for registering coins of two different denominations, the counter 28 being what has been termed the primary counter, and the counter 29 being the secondary counter. The counter 28 is actuated both when a nickel is passed through the machine and also when a dime is passed through, while the counter 29 is actuated only when a dime is passed through the machine.

The counter 28 is actuated by a direct gear connection with the sliding carriage. As shown in Fig. 7, the crank-wheel 9 is provided with gear-teeth 30 which engage the teeth of a gear 31 mounted on a stud 32 carried by the plate 23. Secured to the gear 32 is a pinion 33 which meshes with a gear 34 secured to the shaft 35 of the counter 28.

The arrangement is such that at each revolution of the crank-wheel 9 which takes place at each upward and downward movement of the carriage the shaft of the counter 28 will be given one complete revolution, and it is to be understood that one revolution of said counter-shaft serves to advance one of the numeral wheels of the counter one step.

Figure 12:
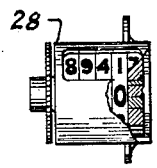
Fig. 12 is a front view partly in section of one of the counters employed.
Figure 13:
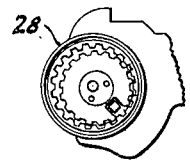
Fig. 13 is an end view of said counter with the cover removed.

Any suitable counter provided with numeral wheels may be employed, but for the counter which is to be thus actuated by a direct gear connection with the carriage it is preferred to employ a counter of that type in which the movement of the numeral wheel is practically completed by a half revolution of the counter-shaft, as for example, a counter of the well-known Veeder type, such as shown in Figs. 12 and 13 and as more fully shown in the patent to Veeder No. 548,482. By employing a counter of this character the registering of the coin may be effected by the downward movement of the carriage and thus practically by the coin itself, and so that such registration is not dependent upon the upward movement of the carriage which is effected by the operator through the rack-bar 8. Of course if it should be so desired the parts may be so arranged that the counter may be so set that the registration of the coin will take place during the upward movement of the carriage, instead of during its downward movement, but it is preferred, for the reason above stated, that the registration shall be effected by the downward movement of the carriage.

As above stated, the counter 29 is to be actuated only when the dime is passed through the machine and is not to be actuated when a nickel is passed therethrough. For this purpose the next feature of the invention consists of certain selective mechanism adapted to cause or to prevent, as the case may be, the operation of said counter 29. Thus said selective mechanism is so constructed that when a nickel is passed through the machine, said counter 29 will not be operated, but only the counter 28, whereas when a dime is passed through the machine, not only the counter 28 will be operated but the counter 29, the counter 28 being as above stated, operated by each and every coin, by reason of its direct gear connection with the sliding carriage above described.

Figure 6:
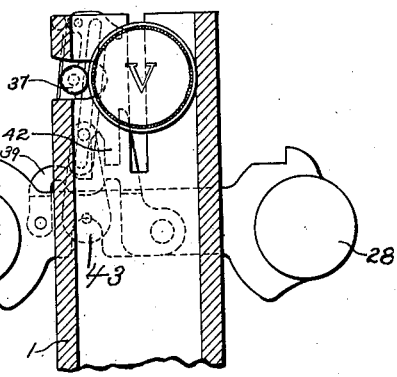
Fig. 6 is a longitudinal section through the coin-chute looking from the front of the mechanism.

Pivoted to the frame 1 is a slotted lever 36 carrying a roll 37. Acting upon said lever 36 is a spring 38 which acts when free to do so to move the pivoted lever to the left and into the position shown in Fig. 1 and so as to bring the roll 37 into the coin-chute and into the path of a nickel passing through said chute. The arrangement is such that the passage of a nickel past said roll will serve to move the pivoted lever 36 from the position shown in Fig. 1 to the position shown in full lines in Fig. 4 and in dotted lines in Fig. 6.

Figure 4:
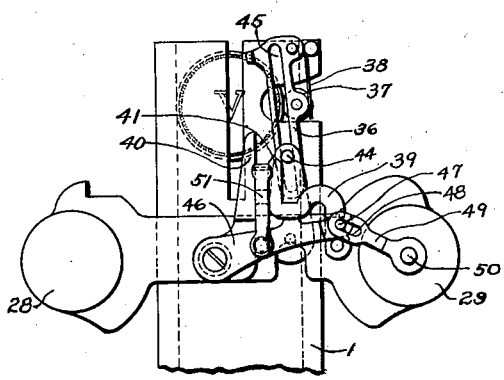
Fig. 4 is a like rear elevation with still other portions broken away and showing the parts in a still different position, as determined by the insertion of a nickel.
Figure 5:
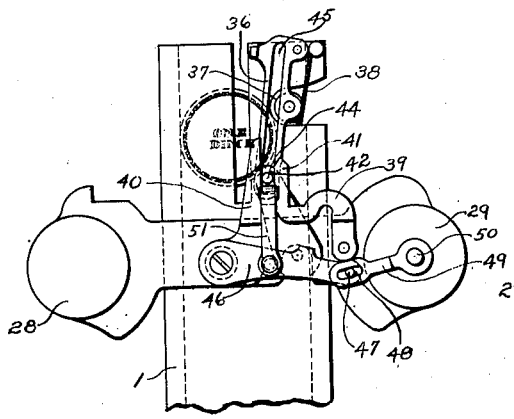
Fig. 5 is a rear elevation corresponding to Fig. 4, but showing the parts in a still different position, as determined by the insertion of a dime.

It will be understood that at this time the nickel is firmly grasped by the gripping jaws and that the carriage is moved downward by the spring-motor, and so that the nickel thus firmly held constitutes in effect a cam, and as such cam, acts by its engagement with the roll 37 to force back the pivoted lever 36 from the position shown in Fig. 1 to the position shown in Fig. 4, as above stated.

Secured to the frame 1 is a plate 39 provided with two fingers or projections 40 and 41 forming a slot 42 between said fingers, to be hereafter referred to. The upper end of the projection 41 is beveled or cam-shaped, as shown.

Also pivoted on the sliding carriage is an arm 43. Extending through the upper end of said arm 43 is a pin 44 arranged to project on both sides of said arm. The forwardly projecting end of said pin 44 extends into the slot 45 formed in the lever 36, and said pin 44 is therefore caused, as the sliding carriage moves downward, to travel in said slot 45, whatever the position of the lever 36 may be. When, therefore, said lever 36 is pressed to the right and into the position shown in Fig. 4 by the passage of a nickel past the roll 37, the rearwardly projecting end of said pin 44 will be caused to move downward to the right of the projection 41, and when said pin thus moves down to the right of said projection 41, the counter 29 will, as will be hereafter explained, not be operated. The engagement of the pin 44 with the beveled or cam surface at the upper end of the projection 41 will serve to move the lever 36 somewhat farther to the right, and so as to release the nickel from the pressure of the roll thereon under the action of the spring 38. Thus when the lever 36 is moved to the position shown in Fig. 4, as above described, only the counter 28 will be operated and said counter will register the nickel so passed through the machine.

Pivoted to the frame is a lever 46. Projecting from the outer end of said lever is a pin 47 which projects into a slot 48 formed in a lever-arm 49 connected to the shaft 50 of the counter 29. Pivoted to the lever 46 is an upwardly extending arm 51, the upper end of which arm is bent inward and extends into the slot 42 between the arms 40 and 41.

With the parts in the position shown in Fig. 1, it will be seen that the slot 45 in the lever 36 communicates with, or is substantially in line with said slot 42, and so that if the carriage is moved downward with the lever 36 in the position shown in Fig. 1, the forwardly projecting end of the pin 44 will enter the slot 42 and will engage the upper end of the arm 51.

Figure 3:
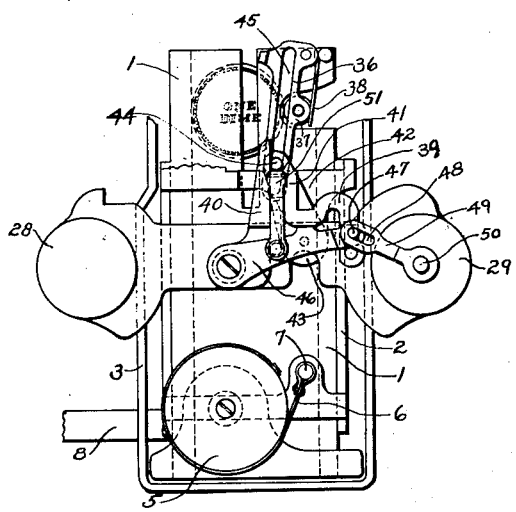
Fig. 3 is a rear elevation corresponding to Fig. 1, but with certain parts broken away or omitted, and showing the mechanism in a different position, as determined by the insertion of a dime.

The construction and arrangement of the parts are such that when a dime is passed through the coin-chute said dime will pass freely by the roll 37 and without imparting any movement to the lever 36, which will therefore remain in its normal position, as shown in Fig. 3.

As, therefore, the position of said lever 36 is not changed by the passage of a dime, the result will be that when a dime is inserted and carried downward by the sliding carriage, the rearwardly projecting end of the pin 44 will enter the slot 42 and engage the upper end of the arm 51, as above described, and so that as the carriage continues to move downward said pin 44, which carried by the carriage, will force downward the arm 51 and thus turn the lever 46 upon its pivot so as to impart movement to the arm 49 and thereby turn the arm 49 attached to the shaft of the counter 29, and so as to move the units numeral wheel of said counter one step.

It will be noted that by reason of the mechanism for actuating said counter 29 said counter should preferably be of a type, the shaft of which is rotated one-tenth of a revolution for each registration of the unit numeral wheel.

With the construction above described it will be seen that when a nickel is inserted and carried downward by the sliding carriage the selective lever 36, as it may be termed, will be moved to the position shown in Fig. 4, and so that the pin 44 will not engage the arm 51, and so that, therefore, the counter 29 will not be operated, but counter 28 will be operated only the counter 28 will be operated by its direct gear connection with the carriage. When, however, a dime is inserted and carried downward by the carriage the selective lever 36 will remain in its normal position, and so that the pin 44 will be brought into engagement with the arm 51, and so that the continued downward movement of the carriage will impart movement to the lever 46 and thus operate the counter 29. It will be understood, however, that when the counter 29 is thus operated, the counter 28 will also be operated by its direct gear connection with the carriage, or in other words, both counters will be operated when a dime is passed through the machine, whereas only the counter 28 will be operated when a nickel is passed through. Thus the counter 28 will register the number of coins, both nickels and dimes, which have been passed through the machine, while the counter 29 will register and indicate how many of those coins were dimes. Thus by adding together at any time the number registered on the counter 29 and the number registered on the counter 28, the sum will represent the total number of five-cent fares which have been collected and registered.

It will be understood that, mechanically considered, the operation or non-operation of the secondary counter 29 is determined or controlled by the diameter of the inserted coin, rather than by the denomination thereof, and it will be further understood that the register above described is thus adapted for registering upon the different counters the number of metal or other disks of two different diameters passed through the register and irrespective of whether said disks are coins or are merely employed to represent any two different things, the account of which is to be separately kept.

What I claim as my invention and desire to secure by Letters Patent is:—

1. A fare register having in combination a primary counter for registering coins of one denomination, a secondary counter for registering coins of another denomination, means for operating said primary counter when a coin of corresponding denomination is inserted, and means for preventing the operation of said secondary counter when such coin is inserted.

2. A fare register having in combination a primary counter for registering coins of one denomination, a secondary counter for registering coins of another denomination, means for operating said primary counter when a coin of corresponding denomination is inserted, and means positioned by a coin of the other denomination for operating said secondary counter.

3. A fare register having in combination a primary counter for registering coins of one denomination, a secondary counter for registering coins of another denomination, means for operating said primary counter when a coin of corresponding denomination is inserted, and means for operating both of said counters when a coin of the other denomination is inserted.

4. A fare register having in combination a primary counter for registering coins of one denomination, a secondary counter for registering coins of another denomination, means for operating said primary counter when a coin of either denomination is inserted, and means for operating said secondary counter when a coin of corresponding denomination is inserted.

5. A fare register having in combination a coin-carrying carriage, a registering counter, and a direct and permanent connection between said carriage and said counter, whereby the movement of said carriage will serve to positively operate said counter.

6. A fare register having in combination a coin-carrying carriage provided with gripping jaws adapted to grip a coin, a registering counter, and a positive connection between said carriage and said counter.

7. A fare register having in combination a coin-carrying carriage provided with gripping jaws adapted to grip a coin, a registering coin, and a gear connection between said carriage and said counter.

8. In a fare register, the combination, with a sliding carriage, of a registering counter, devices adapted to connect said carriage and said counter, and means for preventing the engagement of said devices.

9. In a fare register, the combination, with a sliding carriage, of a registering counter, devices adapted to connect said carriage and said counter, and means adapted to be controlled by a coin for preventing the engagement of said devices.

10. In a fare register, the combination, with a sliding carriage, of a registering counter, devices adapted to connect said carriage and said counter, and means adapted to be controlled by coins of different denominations for permitting or preventing the engagement of said devices.

11. In a fare register, the combination, with a sliding carriage, of two registering counters, a direct connection between said carriage and one of said counters, and coin-controlled means for determining whether the other counter shall or shall not be operated.

12. In a fare register, the combination, with a sliding carriage, of two registering counters, a direct and permanent connection between said carriage and one of said counters, and devices adapted to connect said carriage and the other counter.

13. In a fare register, the combination, with a sliding carriage, of two registering counters, a direct and permanent connection between said carriage and one of said counters, devices adapted to connect said carriage and the other counter, and means for preventing the engagement of said devices.

14. In a fare register, the combination, with a sliding carriage, of two registering counters, a direct and permanent connection between said carriage and one of said counters, devices adapted to connect said carriage and the other counter, and means adapted to be controlled by coins of different denominations for permitting or preventing the engagement of said devices.

15. In a fare register, the combination, with a sliding carriage, of a registering counter, devices adapted to connect said carriage and said counter, and a swinging arm adapted to be operated by a coin for preventing the engagement of said devices.

16. In a fare register, the combination, with a sliding carriage, of two registering counters for registering coins of different denominations, devices adapted to connect said carriage and one of said counters, and a swinging arm adapted to be operated by a coin of one denomination to prevent the engagement of said devices.

17. In a fare register, the combination, with a sliding carriage, of two registering counters for registering coins of different denominations, a direct connection between said carriage and one of said counters, devices adapted to connect said carriage and the other counter, and a swinging arm adapted to be operated by a coin of one denomination for preventing the engagement of said devices.

18. A fare register having in combination a coin-carrying carriage, a registering counter adapted to be actuated by substantially a half-revolution of its shaft, a positive connection between said coin-carrying carriage and said shaft, whereby said counter may be positively actuated by a movement of said coin-carrying carriage in one direction.

19. A fare register having in combination a coin-carrying carriage provided with gripping jaws, a registering counter adapted to be actuated by substantially a half-revolution of its shaft, and a positive connection between said coin-carrying carriage and said counter-shaft.

20. A fare register having in combination a coin-carrying carriage, a registering counter adapted to be actuated by substantially a half-revolution of its shaft, and a gear connection between said coin-carrying carriage and said shaft.

21. A fare register comprising a coin-carrying carriage provided with a pair of movable gripping jaws adapted to grip the coin on opposite sides thereof.

22. A fare register comprising a coin-carrying carriage provided with a pair of movable gripping jaws adapted to grip the coin on opposite sides thereof, and means for operating said gripping jaws to grip and release the coin.

23. A fare register comprising a pair of gripping jaws adapted to grip the coin on opposite sides, and means operated by the insertion of a coin for causing the coin to be gripped by said jaws.

24. A fare register comprising a pair of spring-operated gripping jaws adapted to grip the coin on opposite sides, means for normally holding said jaws separated, and a tripping device adapted to be operated by the insertion of a coin for releasing said gripping jaws to grip the coin.

25. A fare register comprising a pair of spring-operated gripping jaws adapted to grip the coin on opposite sides, a toggle for operating said gripping jaws, means for normally holding said jaws separated, and a tripping device adapted to be operated by the insertion of a coin for releasing said gripping jaws to grip the coin.

26. In a fare register, the combination of a sliding carriage, a pair of gripping jaws mounted on said carriage and adapted to grip the coin on opposite sides, and means for operating said gripping jaws to grip and release the coin.

GEORGE F. ROOKE.

Witnesses:
W. H. THURSTON,
J. H. THURSTON.